(12) United States Patent
Yamaguchi (10) Patent No.: US 6,876,408 B2
(45) Date of Patent: Apr. 5, 2005

(54) COLLIMATING PLATE, LIGHTING APPARATUS AND LIQUID CRYSTAL DISPLAY APPARATUS

(75) Inventor: Akira Yamaguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 192 days.

(21) Appl. No.: 09/782,042

(22) Filed: Feb. 14, 2001

(65) Prior Publication Data

US 2001/0019378 A1 Sep. 6, 2001

(30) Foreign Application Priority Data

Feb. 14, 2000 (JP) .................................. 2000-034844
Feb. 14, 2000 (JP) .................................. 2000-034846

(51) Int. Cl.[7] ........................ G02F 1/1335; G02B 27/10
(52) U.S. Cl. ........................ 349/57; 349/61; 349/95; 359/619; 359/620
(58) Field of Search ........................ 349/57, 61, 95, 349/58; 359/619, 620, 618, 625

(56) References Cited

U.S. PATENT DOCUMENTS

| 5,369,544 A | | 11/1994 | Mastrangelo | ............ 361/283.4 |
| 5,748,828 A | * | 5/1998 | Steiner et al. | ............... 385/146 |
| 5,946,100 A | * | 8/1999 | Ishihara | ....................... 356/608 |
| 6,295,107 B1 | * | 9/2001 | Watanabe et al. | ............. 349/95 |
| 6,392,780 B1 | * | 5/2002 | Fujimori | ...................... 359/246 |
| 2001/0015780 A1 | | 8/2001 | Yamaguchi | |

FOREIGN PATENT DOCUMENTS

| JP | 5-333202 | 12/1993 |
| JP | 6-95099 | 4/1994 |
| JP | 7-7162 | 1/1995 |

* cited by examiner

Primary Examiner—Tarifur R. Chowdhury
Assistant Examiner—Hoan Chau Nguyen
(74) Attorney, Agent, or Firm—Sughrue Mion, PLLC (57) ABSTRACT

The light collimating plate includes a lens substrate, a plurality of microlenses disposed on a surface of the lens substrate, a plurality of light entrance areas, each having a circular or rectangular form a center of which is on an optical axis of the microlens, and a light shield layer formed on another surface of the lens substrate, and covering other area than the light entrance areas. When n and t are a refractive index and a thickness of the lens substrate, respectively, and C (R; diameter, A, B; sides of rectangle) is a size of light entrance area, a size of the microlens Sr satisfies the following formula in the light collimating plate: $Sr \geq 2t \times \tan \theta + C$ (with the proviso that $\theta = \sin^{-1}(1/n)$). Or, a form of the microlens in the light collimating plate is a part of an ellipsoid shown in the following formula $X^2/a^2 + y^2/a^2 + z^2/c^2 = 1$ (x and y represent axis on the surface of the lens substrate, z represents the optical axis), it's accentricity $\epsilon$ is shown in the following formula $\epsilon = (c^2 - a^2)^{1/2}/c = 1/n$ and it's far focal point is on a position of the light entrance area. The lighting apparatus and the liquid crystal display apparatus use the light collimating plate.

9 Claims, 8 Drawing Sheets

COLLIMATING PLATE, LIGHTING APPARATUS AND LIQUID CRYSTAL DISPLAY APPARATUS

BACKGROUND OF THE INVENTION

The present invention relates to the technical field of increasing a range of viewing angles in liquid crystal display devices. More particularly, the present invention relates to a collimating plate having a high or an excellent collimating capability, a lighting apparatus which is provided with such a collimating plate, and a liquid crystal display apparatus comprising such a lighting apparatus, which all effecting the increase in a range of viewing angles in the liquid crystal display.

The opportunity or the frequency of use of liquid crystal displays (LCDs) as a display for word processors and computers is rapidly increasing today. The use of LCDs as a monitor in ultrasonic, CT and MRI diagnostic apparatus is under review. Conventionally, these medical diagnostic apparatus have primarily used CRTs (cathode-ray-tubes) as a monitor.

LCDs have many advantages such as ease in size reduction, small thickness and lightweightness. On the other hand, they have poor viewing angle characteristics (narrow viewing angle) since as the viewing direction or angle changes, the contrast of an image degrades sharply and the gradation also reverses to have the image look differently. As a result, depending on a position of a viewer, the image can not be viewed correctly.

In medical applications described above, diagnosis with monitors is based on the difference in image density, so that not only is it required to produce an image of high contrast ratio but at the same time, incorrect or improper recognition of an image can cause wrong diagnosis or inconsistency in the results of diagnoses. Under these circumstances, it is required that images of high contrast ratio be displayed over a -wide range of viewing angles, particularly, in a case that diagnosticians such as a plurality of doctors and the like view a medical diagnostic image. Another problem peculiar to medical monitors is that image is usually displayed in monochrome (black and white colors) and, hence, suffers considerable contrast degradation as the viewing angle varies.

A known method for increasing the viewing angle of LCDs relies upon using a collimated backlight and an image-bearing light that has passed through the liquid crystal display panel is diffused with a light diffusing plate (see Japanese Examined Patent Publication No. 7-7162, Unexamined Published Japanese Patent Application No. 6-95099 and the like).

In this method, the viewing angle of an LCD increases, as a collimated light which has a higher luminance and is of better directivity (i.e. has a smaller divergence angle) is used.

For this reason, a collimating plate for changing a diffused light into a collimated light is required to sufficiently condense a diffused light incident thereon and to utilize with high efficiency a light projected from a light source as well.

Further, a flare, that is, the light which has not passed through a predetermined optical path of a collimating plate and has been inadequately issued causes an uneven display or a blurred image. Especially for the medical applications as mentioned above, the problem of an uneven display or a blurred image is critical, because it may induce an improper diagnosis.

Accordingly, a light collimator for LCDs is eagerly required to seldom generate a flare as well as to possess an excellent collimating capability. However, conventional collimating plates have not been satisfactory at such points.

A collimating plate used in an LCD for the purpose of increasing its viewing angle should sufficiently condense a diffused light incident thereon and issue a collimated light which is of good directivity and has a high luminance. Thus, a collimating plate possessing a more excellent collimating capability has been needed, but not realized yet.

SUMMARY OF THE INVENTION

The present invention has been accomplished under these circumstances. It is a first object of the present invention to provide a collimating plate possessing an excellent collimating capability, that can issue a collimated light which has a high luminance and is of good directivity; a lighting apparatus provided with such a collimating plate, that utilizes light with high efficiency and can issue a collimated light which has a high luminance and is of good directivity; and a liquid crystal display apparatus comprising such a lighting apparatus, that can display an image of high contrast over a wide range of viewing angles.

In addition to the first object as above, it is a second object of the present invention to provide a collimating plate that seldom generate a flare; a lighting apparatus provided with such a collimating plate; and a liquid crystal display apparatus comprising such a lighting apparatus, that can display an image without display unevenness or image blur.

In order to attain the first and second objects described above, the first aspect of the present invention provides a collimating plate comprising: a lens substrate; a plurality or microlenses disposed on a surface of the lens substrate; a plurality of light entrance areas, each having a circular form a center of which is on an optical axis of each of the plurality of microlenses and set on another surface of the lens substrate reverse to the plurality of microlenses; and a light shield layer formed on another surface of the lens substrate reverse to the plurality of microlenses so as to cover other area than the plurality of light entrance areas, wherein when a refractive index of the lens substrate is represented by n; a thickness of the lens substrate by t; a diameter of each of the plurality of light entrance areas by R; and a size of each of the plurality of microlenses by Sr, the following formula (1):

$$Sr \geq 2t \times \tan\theta + R \tag{1}$$

(with the proviso that $\theta = \sin^{-1}(1/n)$)
is satisfied.

Preferably, the plurality of microlenses are either in circular form when viewed from a direction of the optical axis and are arranged in a closest packing state or in hexagonal form when viewed from the direction of the optical axis and are arranged in a hexagonal close-packed state.

In order to attain the first and second objects described above, the second aspect of the present invention provides a collimating plate comprising: a lens substrate; a plurality of microlenses disposed on a surface of the lens substrate; a plurality of light entrance areas, each having a rectangular form a center of which is on an optical axis of each of the plurality of microlenses and set on another surface of the lens substrate reverse to the plurality of microlenses; and a light shield layer formed on another surface of the lens substrate reverse to the plurality of microlenses so as to cover other area than the plurality of light entrance areas, wherein, when a refractive index of the lens substrate is represented by n; a thickness of the lens substrate by t; a length of a side of each of the plurality of light entrance areas by A; a length of another side of each of the plurality of light entrance areas by B; a size of each of the plurality of microlenses in a direction of the length A represented by Sa; and a size of each of the plurality of microlenses in a direction of the length B represented by Sb, the following formulae (2) and (3):

$$Sa \geq 2t \times \tan\theta + A \quad (2)$$

$$Sb \geq 2t \times \tan\theta + B \quad (3)$$

(with the proviso that $\theta = \sin^{-1}(1/n)$)
are satisfied.

Preferably, the plurality of microlenses are either in square form viewed from a direction of the optical axis and are arranged in a square closed-packed state or in rectangular form viewed from the direction of the optical axis and are arranged in a rectangular closed-packed state.

In order to attain the first object described above, the third aspect of the present invention provides a collimating plate comprising: a lens substrate; a plurality of microlenses disposed on a surface of the lens substrate; a plurality of light entrance areas disposed on another surface of the lens substrate reverse to the plurality of microlenses, and having an optical axis of each of the plurality of microlenses; and a light shield layer formed on the another surface of the lens substrate reverse to the plurality of microlenses so as to cover other area than the plurality of light entrance areas, wherein a form of each of the plurality of microlenses is a part of an ellipsoid shown in the following formula (4), wherein an eccentricity $\epsilon$ of the ellipsoid is shown in the following formula (5) and wherein, in the ellipsoid, a focal point away from a side from which light is issued is on a position of each of the plurality of light entrance areas:

$$X^2/a^2 + y^2/a^2 + z^2/c^2 = 1 \quad (4)$$

$$\epsilon = (c^2 - a^2)^{1/2}/c = 1/n \quad (5)$$

wherein x and y represent axes on the surface of the lens substrate; z represents the optical axis; and n represents a refractive index of a material forming the plurality of microlenses.

Preferably, the plurality of microlenses are either in circular form viewed from a direction of the optical axis and are arranged in a closest packing state, or in hexagonal form viewed from the direction of the optical axis and are arranged in a hexagonal close-packed state.

It is preferable that the collimating plate according to each of the first, second and third aspects of the present invention, further comprises a diffuse reflecting layer formed at a light entrance side than the light shield layer so as to cover other area than the plurality of light entrance areas.

Preferably, the refractive index of the lens substrate is between 1.4 and 2.

In order to the first and second objects described above, the fourth aspect of the present invention provides a lighting apparatus comprising: a light source; a lamp housing for containing the light source, whose inner surfaces are covered with a diffuse reflecting layer; and a collimating plate according to each of the first, second and third aspects of the present invention.

In order to the first and second objects described above, the fifth aspect of the present invention provides a lighting apparatus comprising: a collimating plate according to each of the first, second and third aspects of the present invention; and a plurality of light sources, which are disposed in the plurality of light entrance areas of the collimating plate respectively.

Preferably, a light emission size of each of the plurality of light sources is smaller than a size of each of the plurality of light entrance areas.

Preferably, the plurality of light sources are LEDs or organic EL devices.

In order to attain the first and second objects described above, the sixth aspect of the present invention provides a liquid crystal display apparatus comprising: a liquid crystal display panel; and a lighting apparatus according to each of the fourth and fifth aspects of the present invention which launches light into the liquid crystal display panel.

It is preferable that the liquid crystal display apparatus further comprises a light diffusing plate for diffusing an image-bearing light which has passed through the liquid crystal display panel.

DETAILED DESCRIPTION OF THE INVENTION

A collimating plate, a lighting apparatus and a liquid crystal display apparatus according to the present invention are described below in detail with reference to the preferred embodiments shown in the accompanying drawings.

Figure 1:
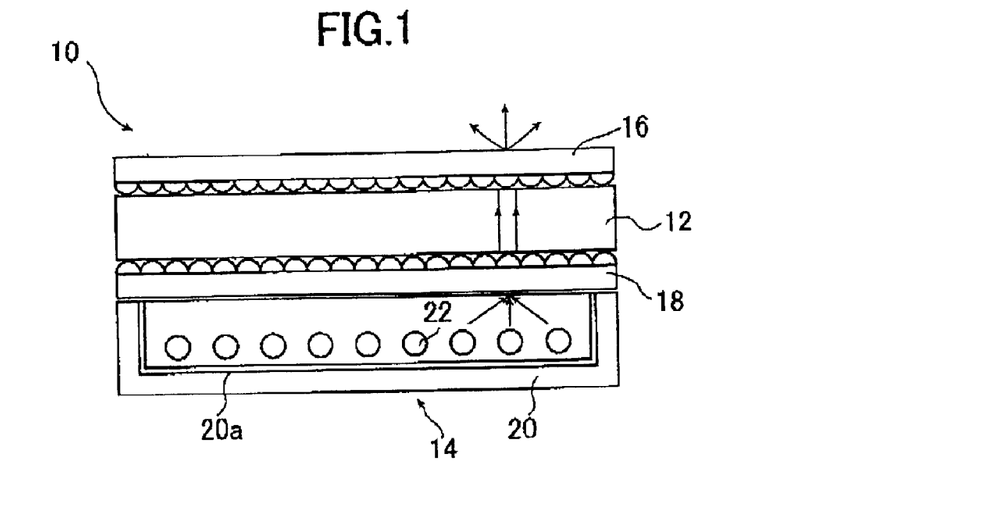
FIG. 1 is a cross sectional view that shows in conceptual form an embodiment of a liquid crystal display apparatus of the present invention.

FIG. 1 shows an embodiment of a liquid crystal display apparatus according to the sixth aspect of the present invention in conceptual form.

The liquid crystal display apparatus (hereinafter referred to as. display apparatus) generally indicated by 10 in FIG. 1 is a so-called liquid crystal display (hereunder referred to as LCD) that utilizes a liquid crystal display panel 12 as an image display device. It comprises the liquid crystal display panel 12, a backlight section 14 that causes collimated light (parallel light) to be incident on the liquid crystal display panel 12 and a light diffusing plate 16 that diffuses an image-bearing light which has passed through the liquid crystal display panel 12.

In the illustrated case, the liquid crystal display panel 12 is connected to its driver (not shown). The display apparatus 10 of the present invention has an opening for image viewing and is combined with any necessary members that are included in known LCDs, such as a casing that has an image viewing window and which holds the backlight section 14, the liquid crystal display panel 12, the light diffusing plate 16, the above-described driver and other members in position.

This display apparatus 10 is of a transmission type LCD in which, as in the conventional transmission type LCD, the collimated light (collimated backlight) issued from the backlight section 14 is incident on the liquid crystal display panel 12 which is being driven in accordance with a displayed image and, then, as it passes through the panel 12, it becomes an image-bearing light which is, subsequently, diffused by the light diffusing plate 16 to cause an image to be displayed.

The backlight section 14 for issuing the collimated light as a backlight for viewing the image displayed on the liquid crystal display panel 12 comprises a collimating plate 18, a (lamp) housing 20 and a light source 22.

This backlight section 14 is a lighting apparatus according to the fourth aspect of the present invention and the collimating plate 18 is therefore a collimating plate of the present invention.

The housing 20 is a rectangular enclosure with one side open. In the backlight section 14 included in the lighting apparatus according to the fourth aspect of the present invention, inner surfaces of the housing 20 are covered with a diffuse reflecting layer 20a that reflects an incident light by diffusion. This design allows the light issued from the light sources 22 to be incident on the collimating plate 18 while being reflected and scarcely absorbed by the inner surfaces of the housing 20 whereupon the collimated light having a high luminance can be issued.

The diffuse reflecting layer 20a is not limited in any particular way and any known type can be used as exemplified by one that is formed by firstly preparing a paint in which fine particles of a light diffusing material such as alumina ($Al_2O_3$), titanium oxide ($TiO_2$) or the like are dispersed and then applying the paint to the inner surfaces of the housing 20.

The housing 20 contains the light sources 22. All known types of the light sources that are used in the so-called transmission type LCDs can be used as the light sources 22 as long as they issue adequate quantities of light.

The collimating plate 18 condenses the light issued from the light sources 22 and the light reflected by the inner surfaces of the housing 20 to produce the collimated light and then issue the resultant collimated light. Having this capability, the collimating plate 18 is placed such that it closes the opening of the housing 20.

Figure 2A:
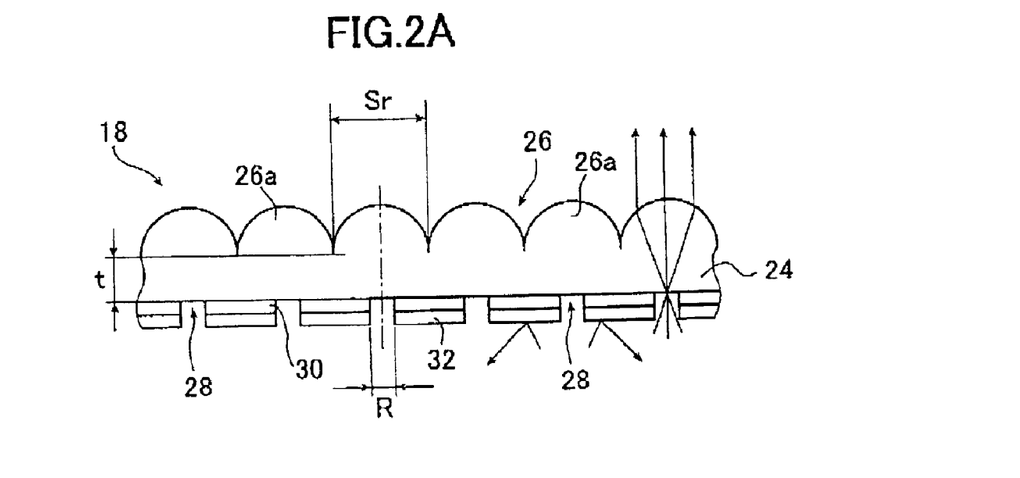
FIG. 2A is a cross sectional view that shows in conceptual form an embodiment of a collimating plate of the present invention.
Figure 3:
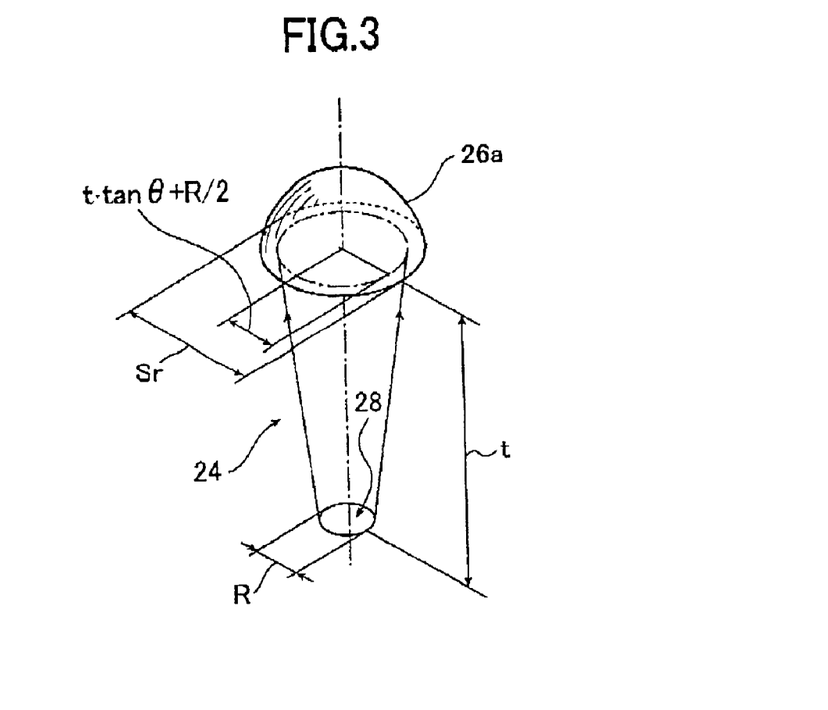
FIG. 3 is a conceptual perspective view for illustrating the collimating plate of the present invention.

FIGS. 2A and 3 schematically show the collimating plate 18.

As shown in both of these figures, the collimating plate 18 comprises a lens substrate 24 in plate form having a microlens array (hereinafter referred to as lens array ) 26 formed on one side as a two-dimensional arrangement of a multitude of hemispherical microlenses 26a.

The surface of the side of the lens substrate 24 away from the lens array 26, that is, of the other side of the lens substrate 24, is entirely covered with a light shield layer 30 except in circular light entrance areas 28 that are set on-axis or in alignment with the optical axes of the microlenses 26a. The surface of the other side, which is also a light entrance side, of the lens substrate 24 is entirely covered also with a diffuse reflecting layer 32 except in the light entrance areas 28.

The collimating plate 18 is fixed on the housing 20 with the side of the lens array 26 facing the liquid crystal panel 12.

As shown in FIG. 2A, the light issued from the housing 20 is launched into the lens substrate 24 via the light entrance areas 28, passes through, is launched into the microlenses 26a, refracted, condensed and issued as collimated light.

Since the collimating plate 18 has the diffuse reflecting layer 32, the light incident on other area than in the light entrance areas 28 is reflected while being scarcely absorbed, goes back to the housing 20, by the diffuse reflection layer 20a of which it is reflected to make another entry into the collimating plate 18 and increases the efficiency of light utilization thereby issuing a collimated light having a high luminance. Any light passing through the diffuse reflecting layer 32 is blocked by the light shield layer 30 so that no flare which can reduce the directivity of the collimated light will be generated.

Constituent materials of the lens substrate 24 and the lens array 26 in such collimating plate 18 are not limited in any particular way and various types of lens materials such as glass, various types of optical resins and the like may be used. The lens substrate 24 and the lens array 26 may be molded monolithically or they may be separate members that are fixed in combination. It should also be noted that refractive index of the lens substrate 24 is not limited in any particular value but is preferably between 1.4 and 2 from the standpoint of collimating capability and the like.

According to the present invention (inclusive of an aspect in which the light entrance areas are rectangular), the microlenses 26a need not be hemispherical and they may advantageously take on a form produced by cutting a sphere by means of a plane which does not pass through the center thereof (smaller one of the resultant spherical crown form)

or an ellipsoid (of revolution) through a plane perpendicular to its major axis (smaller one of the resultant cut products).

Further, according to the present invention (inclusive of an aspect in which the light entrance areas are rectangular), the side of the microlens 26d from which the light is issued (interface between microlens 26a with lens substrate 24), namely, the microlens 26a viewed from a direction of the optical axis need not be circular and it may take on various forms which are rectangular, hexagonal and the like.

The diffuse reflecting layer 32 and the light shield layer 30 are not limited in any particular way and various known types may be used. For example, the diffuse reflecting layer 32 may be a layer which exemplifies layers to be used as the diffuse reflecting layer on inner surfaces of the housing 20 as stated above, while the light shield layer 30 may be made of paint containing carbon black, chromium (Cr) or the like which is used in the BM of the liquid crystal panel 12.

The methods of forming the diffuse reflecting layer 32 and the light shield layer 30 are not limited, either and they may be formed by any known methods such as a method of preparing and applying paint as above to form a layer, thin-film forming techniques (e.g. vapor deposition), printing and the like, the choice of which depends on constituent materials and other factors.

When these layers are formed by paint or thin-film techniques, the light entrance areas 28 may be formed by a known method, such as application of a mask produced by a known method. The mask may be produced by self-alignment using photoresist or the like making use of microlens 26a.

Thickness of either one of the diffuse reflecting layer 32 and the light shield layer 30 is not limited in any particular way and it may be of any value as long as it can show a required reflecting capability and light shielding capability. Attention should be paid to that, when the thickness becomes too large, the angle at which a light can be incident on the light entrance areas 28 may be narrower to cause a reduction of efficiency.

Figure 2B:
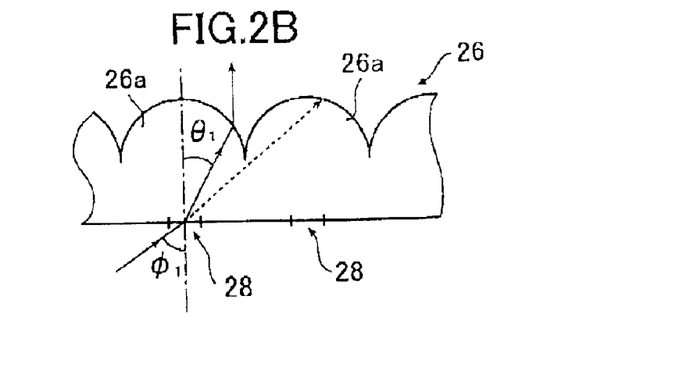
FIG. 2B is a cross sectional view that shows in conceptual form how a collimating plate of the present invention works.
Figure 4:
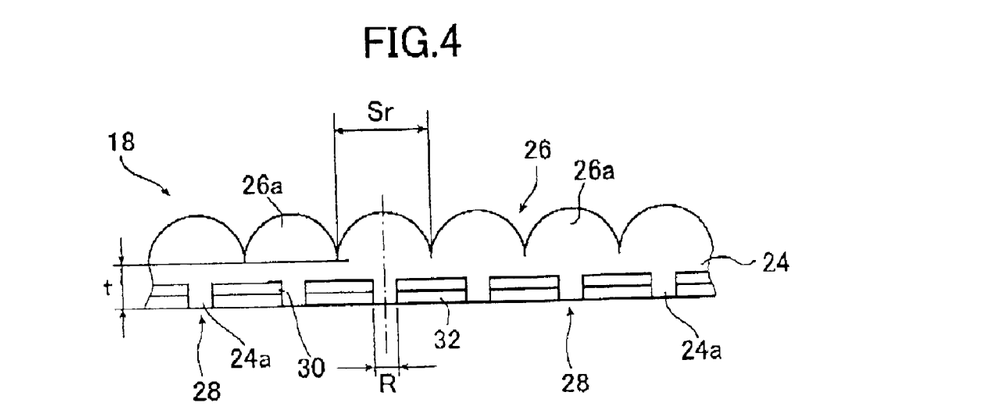
FIG. 4 is a cross sectional view that shows in conceptual form another embodiment of a collimating plate of the present invention.

In the embodiments shown in FIGS. 2A and 2B, the side of the lens substrate 24 away from the lens array 26 is flat and the light entrance areas 28 are set on this side; however, the present invention is not limited to the above configurations and, as shown in FIG. 4, protrusions 24a may be provided on the side of the lens substrate 24 away from the lens array 26 whereupon end surfaces of the protrusions 24a may become respective light entrance areas 28.

Such protrusions 24a may be produced by a known forming method.

In the collimating plate 18 of the present invention, as shown in FIGS. 2A, 2B and 3, if the refractive index of the lens substrate 24 is written as n, the thickness of the lens substrate 24 (distance from the side thereof closer to the light entrance areas 28 to the microlens 26a) as t, the diameter of the light entrance areas 28 as R, the size of the microlens 26a as Sr (in the illustrated cases, the microlens 26a is hemispherical so that the size is given as the diameter of a corresponding sphere), the following relation (1) is satisfied:

$$Sr \geq 2t \times \tan\theta + R \quad (1)$$

(with proviso that $\theta = \sin^{-1}(1/n)$)

As shown in FIG. 2B, the light launched into the lens substrate 24 at a given incident angle $\phi_1$ is refracted, advances at an angle of $\theta_1$ relative to the optical axis, is launched into the microlens 26a, is refracted again and is then issued as a collimated light.

On this occasion, centers of the light entrance areas 28 are set on-axis or in alignment with the optical axes of the microlens 26a, respectively. Therefore, as shown with a broken line in FIG. 2B, if a light which has been launched into a given light entrance area 28 is incident on a not-corresponding microlens 26a, it becomes a flare (leaking light) to cause the decrease of the collimating capability, resulting display unevenness and image blur on an image displayed on a liquid crystal display.

An incident angle $\phi$ of a light is 90° at a maximum and the light incident at the angle of 90° advances at the angle $\theta$ of the largest value. The angle $\theta$, at which the light launched into a given medium at the incident angle of 90° advances, can be calculated in accordance with Snell laws of refraction: $\theta = \sin^{-1}(1/n)$ (wherein n indicates refractive index of medium).

Take, for example, the case that the formed material of the lens substrate 24 is an acrylic material. Since the refractive index n thereof is 1.49, $\theta$ becomes 42.16°.

Thus, as shown in FIG. 3, a light launched into a light entrance area 28 of a diameter R advances in the lens substrate 24 of a thickness t and is launched into the microlens array 26 when it is distant from the optical axis of the corresponding microlens 26a by "t×tan θ+R/2" at a maximum.

Consequently, if the size Sr of a microlens 26a is equal to or larger than "2t×tan θ+R", a light launched into a light entrance area 28 is inevitably incident on the corresponding microlens 26a.

In this way, the collimating plate of the present invention avoids the generation of a flare which is incident on a not-corresponding microlens 26a, to thereby prevent the reduction of directivity and efficiency of a collimated light due to the flare, and can issue such light components that are formerly to become a flare as a collimated light also, thus capable of showing a very high collimating capability. As mentioned before, the collimating plate of the present invention can issue a collimated light having a high luminance under utilizing light with high efficiency by virtue of the diffuse reflecting layer 32 provided on the light entrance side.

Further, a collimated light can be issued with higher efficiency, as the project area of a light launched into a microlens 26a is larger. For this purpose, it is most preferable that the size Sr is the same as (2t×tan θ+R). However, for the unfailing prevention of a flare it is necessary to give some margin to it.

Therefore, it is preferable that the size Sr is allowed to be a little larger than, but almost the same as the relation, (2t×tan θ+R), so that the microlens 26a can maximally be utilized to issue the collimated light in an extremely efficient manner.

For example, when the lens array 26 and the lens substrate 24 are molded monolithically and their molding materials are acrylic (n=1.49), the thickness t of the lens substrate 24 is 300 μm and the diameter R of the light entrance areas 28 is 50 μm, the size Sr of the microlens 26a may be 593.2 μm or larger. Namely, for example, by setting the size Sr as 600 μm, the collimated light can efficiently be issued.

Alternatively, in contrast, at least one of the thickness of the lens substance 24 and the diameter R of the light entrance areas 28 may be selected or adjusted in accordance with the size Sr of the microlens 26a.

Figure 5:
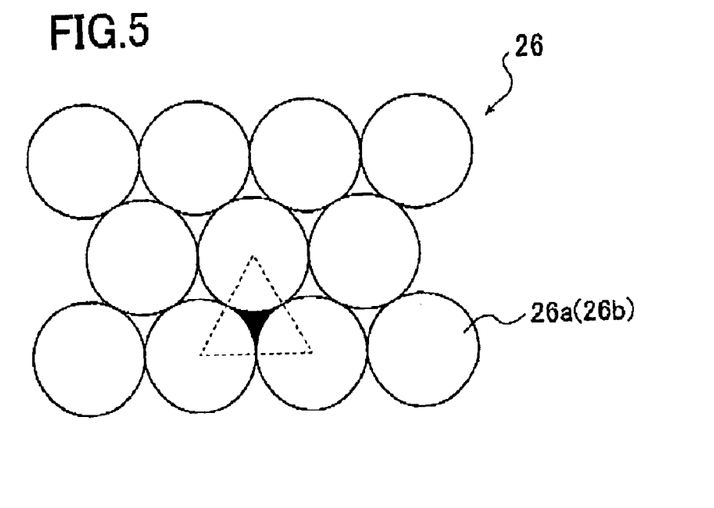
FIG. 5 is a plan view that schematically shows an embodiment of a microlens array for use in a collimating plate of the present invention.

In the present embodiment (the light entrance area 28 is circular), it is preferable that the form of the surface of the microlens 26a from which the light is issued (form of microlens viewed from the direction optical axis) is circular as illustrated and, as schematically shown in FIGS. 2A and 5, microlenses 26a are arranged all over the surface of the lens substrate 24 in a maximum density state, in other words, the microlenses 26a are arranged in a closest packing state.

By taking these designs, the area which can not issue the collimated light is only a gap among microlenses 26a which is shown as an area filled in black in FIG. 5 and, therefore, the ratio of the area of the surface from which the collimated light is issued against the area of the lens substrate 24 can be brought to be 90.7% ($=\pi/(2\times[3^{1/2}])$) maximally thereby allowing to obtain a more efficient collimating plate.

Figure 6A:
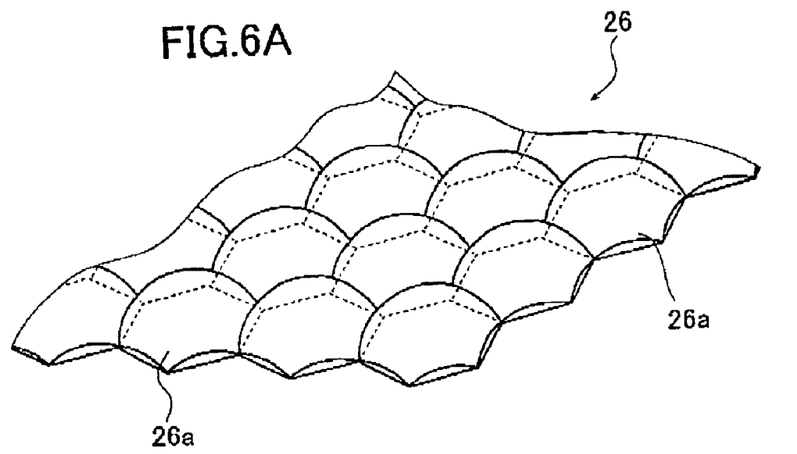
FIG. 6A is a perspective view that schematically shows another embodiment of a microlens array for use in a collimating plate of the present invention.

Alternatively, in the present embodiment, it is also preferable that the form of the surface from which the light is issued is set as being hexagonal as described above, and, as schematically shown in FIGS. 6A and 6B, the microlenses 26a are arranged in a hexagonal close-packed structure (honeycomb structure).

Figure 6B:
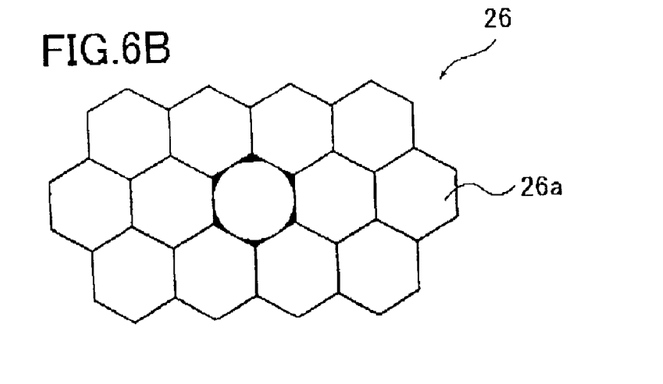
FIG. 6B is a plan view that schematically shows the embodiment shown in FIG. 6A.

By taking this structure, the area which can not issue the collimated light is only an area outside of a circle inscribed in this hexagonal form which is shown as an area filled in black in FIG. 6B and, therefore, the ratio of the areas of the surface from which the collimated light is issued and the surface of the lens substrate 24 can be brought to be 90.7% ($=3^{1/2}\pi/6$) maximally thereby allowing to obtain a more efficient collimating plate.

In the present embodiment, in the case that the form of the surface of the microlens 26a from which the light is issued is circular, the size Sr of the microlens 26a is the diameter thereof, whereas in the case that the form of the surface of the microlens 26a from which the light is issued is not circular, the size Sr of the microlens 26a is the diameter of the circle inscribed in the form of the surface from which the light is issued.

In the above-described embodiment, the light entrance areas 28 are circular whereas the collimating plate according to the second aspect of the present invention has rectangular light entrance areas.

In this collimating plate, if the length of one side of the rectangular light entrance area is written as A, the length of another side of the rectangular light entrance area as B, the size of the microlens in a direction corresponding to the side having the above-described length A as Sa, the size of the microlens in a direction corresponding to the side having the above-described length B as Sb, other factors than the above-described factors are the same as in the previous embodiment, the following relations (2) and (3) are satisfied:

$$Sa \geq 2t \times \tan \theta + A \quad (2)$$

$$Sb \geq 2t \times \tan \theta + B \quad (3)$$

(with the proviso that $\theta = \sin^{-1}(1/n)$)

Also in this embodiment, the center (intersection point of diagonal lines of the rectangle) of the rectangular light entrance area is set on-axis or in alignment with the optical axis of the corresponding microlens.

Further, the sizes Sa and Sb of the microlens are lengths of respective sides of the rectangle inscribed in the form of the surface of the microlens from which the light is issued; the sides of the inscribed rectangle are in the same direction (in the direction of rotation around the optical axis) as those of the light entrance area; the ratio of two adjacent sides of the inscribed rectangle is the same as that of the light entrance area. Namely, when the light entrance area is square, each of the sizes Sa and Sb of the microlens is the length of a side of a square inscribed in the form of the surface of the microlens from which the light is issued in the same direction as the light entrance area. Further, when the light entrance area is rectangular (other than square), the sizes Sa and Sb of the microlens are the lengths of the sides of the rectangle inscribed in the form of the surface of the microlens from which the light is issued, being in the same direction as the light entrance area and, further, having the same ratio of the long and short sides as that of the light entrance area.

In the same way as in the above-described embodiment, according to such a collimating plate of the present invention, the generation of a flare which is incident on a not-corresponding microlens is avoided and the reduction of directivity and efficiency of a collimated light due to the flare is prevented, so that an extremely high collimating capability is achieved.

In addition, the collimating plate as above can also issue with good efficiency a collimated light having a high luminance by virtue of the diffuse reflecting layer 32 provided on the light entrance plane.

This collimating plate basically has the same constitution as that of the above-described collimating plate having a circular light entrance area except that the form of the light entrance area of this collimating plate is rectangular so that different components will mainly be explained below.

Figure 7:
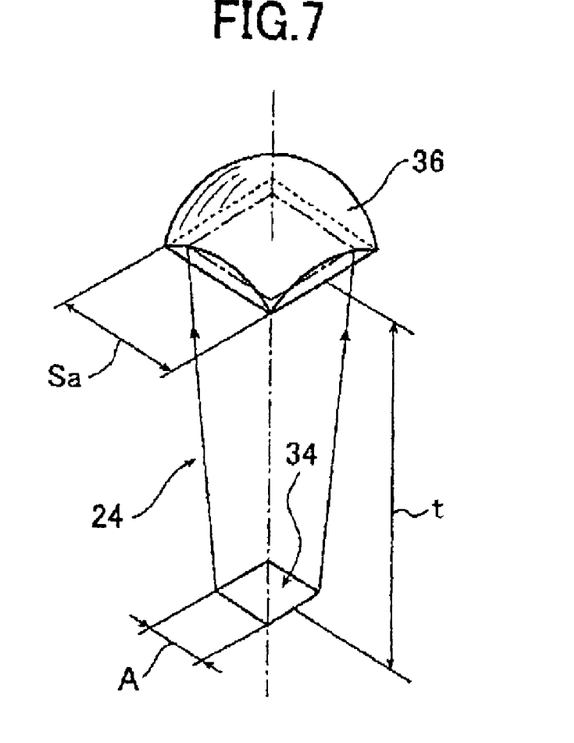
FIG. 7 is a conceptual perspective view for illustrating an embodiment of a collimating plate of the second aspect of the present invention.

FIG. 7 schematically shows an embodiment of the collimating plate having the light entrance area 34 in square form.

In the present embodiment, the microlens 36 is in spherical crown form obtained by cutting a sphere by means of a surface which does not pass through the center thereof; the form of the surface from which the light is issued (the form of the microlens viewed from the direction of the optical axis thereof) is square in the same direction as the light entrance area 34.

On this occasion, in the collimating plate, lengths of sides of the light entrance area 34 are in the relation of A=B so that the sizes of the microlens are in the relation of Sa=Sb. Namely, in the present embodiment, it is enough if the relation: $Sa \geq 2t \times \tan \theta + A$ is satisfied, and the size Sa is preferably the same as or a little larger than $2t \times \tan \theta + A$ in the same way as in the previous embodiment.

Figure 8:
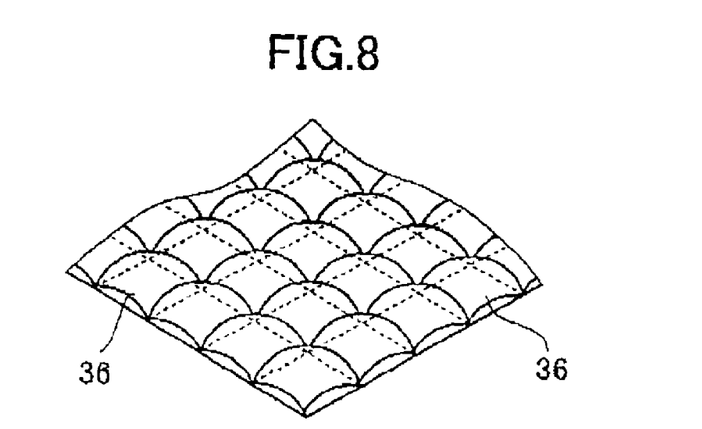
FIG. 8 is a perspective view that schematically shows an embodiment of a microlens array for use in the collimating plate shown in FIG. 7.

In the collimating plate having a square light entrance area 34, it is preferable that the form of the surface of the microlens 36 from which the light is issued is square in the same direction as the light entrance area 34 and the microlenses 36 are arranged in a square close-packed structure, as shown in FIG. 8.

By taking this configuration, the ratio of the surface from which the collimated Light is issued relative to the lens substrate 24 can be brought to almost 100% at a maximum thereby obtaining an extremely efficient collimating plate.

Figure 9:
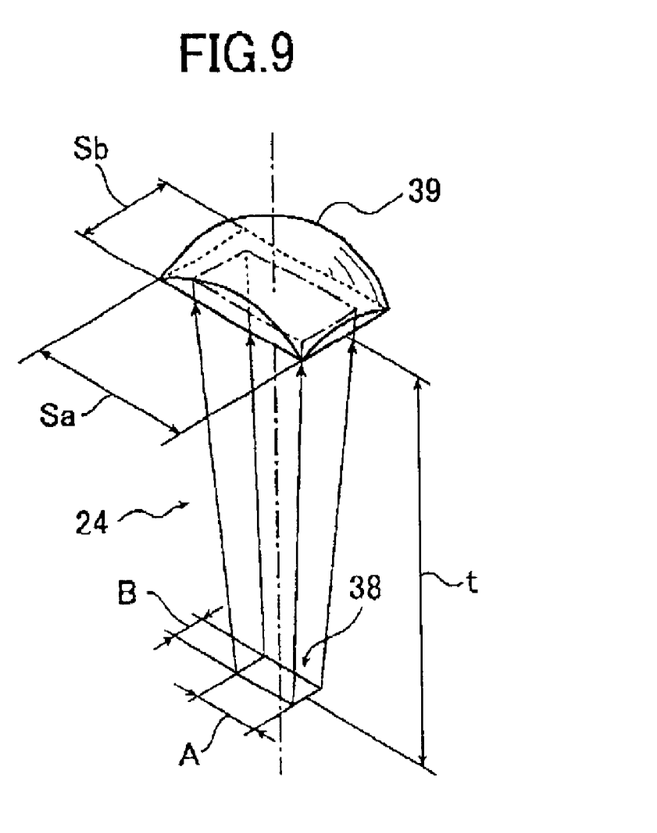
FIG. 9 is a perspective view in conceptual form for illustrating another embodiment of a collimating plate of the second aspect of the present invention.

FIG. 9 schematically shows an embodiment having a rectangular light entrance area.

In the present embodiment, a microlens 39 is in spherical crown form obtained by cutting a sphere by means of a surface which does not pass through the center thereof and the form of the surface thereof from which the light is issued (form of the microlens viewed from the direction of the optical axis thereof) is rectangular having the same ratio of a long side to a short side in the same direction as a light entrance area 38. When, for example, the length of a long side of the light entrance area 38 is written as A, the length of a short side thereof as B (A≠B), the size of the microlens 39 in the direction of the long side of the light entrance area 38 as Sa and the size thereof in the direction of the short side of the light entrance area 38 as Sb, two above-described relations are satisfied. Further, it is also preferable as in the previous embodiment that the sizes Sa and Sb are the same as or a little larger than $2t \times \tan \theta + A$ and $2t \times \tan \theta + B$, respectively.

In the collimating plate having a rectangular light entrance area 38, it is preferable that the form of the surface of the microlens 39 from which the light is issued is of a rectangle which has the same ratio of the long side to the short side as that of the light entrance area 38 and is in the same direction as the light entrance area 38 and the microlenses 39 are arranged in a rectangular close-packed structure in a similar manner to that shown in FIG. 8.

Taking this configuration, the ratio of the surface from which the collimated light is issued relative to the lens substrate 24 is brought to almost 100% at a maximum thereby obtaining an extremely efficient collimating plate.

On this occasion, in the display apparatus 10 according to the present invention, a collimating plate according to the third aspect of the present invention can be used instead of the collimating plate 18.

Figure 10A:
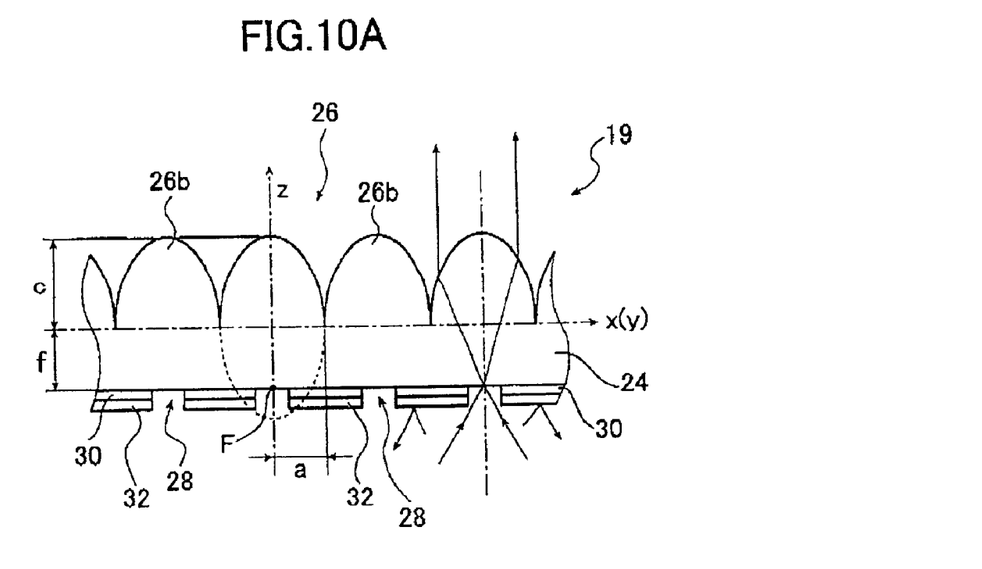
FIG. 10A is a cross sectional view that shows in conceptual form an embodiment of a collimating plate of the third aspect of the present invention.

FIG. 10A schematically shows the collimating plate 19 according to the third aspect of the present invention.

The collimating plate 19 according to the third aspect of the present invention as shown in FIG. 10A and the collimating plate 18 according to the first aspect of the present invention as shown in FIG. 2A are the same except that the form of the microlens 26a of the microlens array 26 of the former is hemispherical whereas that of the microlens 26b of the microlens array 26 of the latter is semielliptic so that the same numerals as used in the collimating plate 18 are used to denote the same components in the collimating plate 19 and the detailed description thereof is omitted.

As shown in FIG. 10A, the collimating plate 19 comprises a lens substrate 24 in plate form having a microlens array 26 formed on one side thereof as a two-dimensional arrangement of a multitude of microlenses 26b, in a similar way to that in the collimating plate 18. As shown in the illustration, the microlenses 26b are in hemielliptic form derived from cutting an ellipse by means of a surface perpendicular to one axis of the ellipse at the center thereof. The form of the microlens 26b will be described in detail below.

The collimating plate 19 is, similarly to the collimating plate 18, fixed to the housing 20 with the side of the lens array 26 facing the liquid crystal panel 12.

The light which has been issued from the interior of the housing 20 is launched into the lens substrate 24 through the light entrance areas 28, passes through it, is incident on the respective microlenses 26b, refracted, condensed and issued as collimated light, as shown in FIG. 10A. How the collimation is operated will be described below.

As with the collimating plate 18, the lens substrate 24 and the lens array 26 of the collimating plate 19 as above may be molded monolithically or they may be separate members that are fixed in combination. By the way, it is preferred in view of the collimating capability and the like that the lens substrate 24 and the lens array 26 have the same refractive index.

Figure 10B:
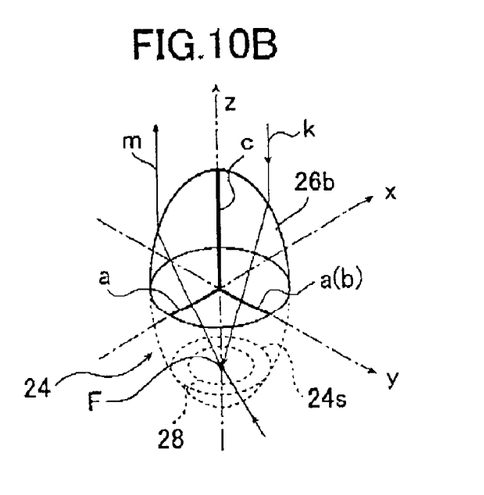
FIG. 10B is a perspective view in conceptual form for illustrating a collimating plate of the present invention.
Figure 11:
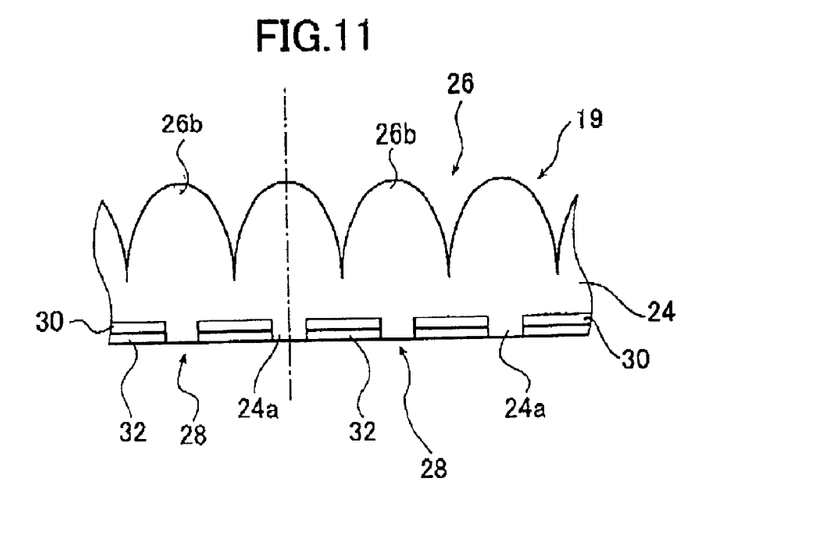
FIG. 11 shows in conceptual form another embodiment of a collimating plate of the present invention.

In the illustrations shown in FIGS. 10A and 10B, the surface of the side of the lens substrate 24 away from the lens array 26 is flat on which the light entrance areas 28 are provided; however, the present invention is not limited to this structure and, as shown in FIG. 11, a protrusion 24a may be provided on the surface of the side of the lens substrate 24 away from the lens array 26 to allow an end surface of the protrusion 24a to be the light entrance area 28. Such a protrusion 24a may be produced by a known molding method.

In the collimating plate 19 according to the present invention, as shown in FIGS. 10A and 10B, when substrate surface directions of the lens substrate 24 are indicated by x axis and y axis; the direction of the optical axis of the microlens 26b (the direction of a normal line of the lens substrate 24) by z axis, the form of the microlens 26b is a part of an ellipsoid in which the optical axis and the z axis are on each other as shown in the following formula (4) and, further, when the refractive index of a material to form the microlens 26b is indicated by n, an eccentricity $\epsilon$ of the ellipsoid is shown by the following formula (5):

$$X^2/a^2+y^2/a^2+z^2/c^2=1 \qquad (4)$$

$$\epsilon=(c^2-a^2)^{1/2}/c=1/n \qquad (5)$$

Moreover, in this ellipsoid, a focal point F located farther than the other, that is, a far focal point from the side from which the light is issued (a focal point nearer to the side into which the light is launched) falls on the light entrance areas 28, namely, the far focal point F is set on, coincident with or in alignment with a surface 24s of the lens substrate 24 away from the microlens 26b.

As is well known, the form of an oval sphere (ellipsoid) is shown by the following general formula:

$$x^2/a^2+y^2/b^2+z^2/c^2=1$$

The eccentricity of the ellipse is shown by the following general formula:

$$\epsilon=(a^2-b^2)^{1/2}/a$$

Therefore, an eccentricity $\epsilon_{x-z}$ and a focal point position $f_{x-z}$ in the x-z plane of the above-described ellipsoid are shown by following respective formulae:

$$\epsilon_{x-z}=(c^2-a^2)^{1/2}/c$$

$$f_{x-z}=c \times \epsilon_{x-z}$$

While, an eccentricity $\epsilon_{y-x}$ and a focal point position $f_{y-z}$ in the y-z plane thereof are shown by following respective formulae:

$$\epsilon_{y-z}=(c^2-b^2)^{1/2}/c$$

$$f_{y-z}=c \times \epsilon_{y-z}$$

In a lens of an ellipsoidal form, when the eccentricity $\epsilon$ is the reciprocal number of the refractive index n of the lens forming material, the light which has been launched from outside and is in parallel with the optical axis is converged on the far focal point F which is located farther than the other from the side into which the light has been launched, as shown by an arrow k in FIG. 10B.

Accordingly, the diffused light which has been launched into the far focal point F is inversely issued from the lens as a light parallel to the optical axis, namely a collimated light, as shown by an arrow m in FIG. 10B.

Further, in an ellipsoid, in the case of "$\epsilon_{x-z}=\epsilon_{y-z}$", the focal point position $f_{x-z}$ in the direction of x-z is set on or coincident with the focal point position $f_{y-z}$ in the direction of y-z.

Therefore, by allowing the length a in the direction of the x axis and the length b in the direction of the y axis to be on each other, namely a=b, in other words, by allowing the form of the ellipsoid to satisfy the relation: $x^2/a^2+y^2/a^2+z^2/c^2=1$ in which the distance thereof in the direction of the x axis or the y axis is 2a and the distance thereof in the direction of the z axis is 2c and, further, by allowing the eccentricity $\epsilon$ of the ellipsoid to satisfy the relation: $\epsilon=(c^2-a^2)^{1/2}/c=1/n$, the light which has been launched into the lens and is in parallel with the optical axis is converged on the focal point F located farther than the other from the side into which the light has been launched and, in contrast, the diffused light which has been launched into the focal point F is condensed to issue as a collimated light.

The collimating plate of the present embodiment, being based on the above-described knowledge, can efficiently condense a diffused light and issue a collimated light of good directivity by allowing the form of a plurality of the microlenses 26b arranged in number on a surface of the lens substrate 24 to be a part of the ellipsoid satisfying the above-described conditions and allowing the light entrance areas 28 (namely, the surface 24s of the side of the lens substrate 24 away from the microlenses 26b) to be on the focal point F located farther than the other from the side from which the light is issued.

The collimating plate of the present embodiment can also issue a collimated light having a high luminance under utilizing light with high efficiency by virtue of the diffuse reflecting layer 32 provided on the light entrance side and avoid the generation of a flare as a result of including the light shield layer 30, as is the case with the embodiment described before.

Such collimating plate according to the present invention may be formed, taking as an example, by making use of the relations:

$$a=[(n^2-1)^{1/2}/n] \times c; \text{ and}$$

$$f=c/n$$

derived from the above-described formulae.

For example, if the lens array 26 (microlenses 26b) and the lens substrate 24 are molded monolithically, the material to be used for molding is an acrylic compound (n=1.49) and c of the microlenses 26b is 100 $\mu$m, then the lens array 26 and the lens substrate 24 maybe molded such that a of the microlenses 26b becomes 74.1 $\mu$m and f thereof becomes 67.1 $\mu$m.

The microlenses 26b are not limited to the hemiellipsoid form as illustrated, as long as they satisfy the above-described conditions but a form (a smaller portion) obtained by cutting an ellipsoid which satisfies the above-described conditions at a position other than the center position of the axis thereof may favorably be employable.

Further, the form of the surface of the microlenses 26b from which the light is issued (interface between the microlenses 26b and the lens substrate 24), namely, the form of the microlenses 26b viewed from the optical axis, is not limited to a circle but various forms, such as rectangle, hexagon and the like are employable.

In the present invention, as shown in FIGS. 10A and 5, the microlenses 26b are preferably arranged such that, while the form of the surface of the microlenses 26b from which the light is issued is circular, the microlenses 26b are disposed over an entire surface of the lens substrate 24 in a maximum density, namely, a closest packing state.

By taking this configuration, the area which can not issue the collimated light is only a gap among microlenses 26b which is shown as an area filled in black in FIG. 5 and, therefore, the ratio between the area of the surface from which the collimated light is issued and the area of the lens substrate 24 can be brought to be 90.7% ($=\pi/(2 \times [3^{1/2}])$) to the maximum thereby allowing to obtain a more efficient collimating plate.

Figure 12A:
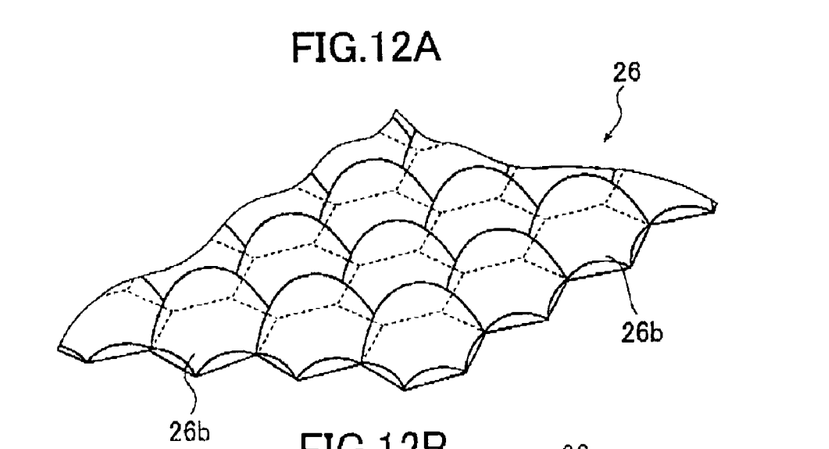
FIG. 12A is a perspective view that schematically shows another embodiment of a microlens array for use in a collimating plate of the present invention.
Figure 12B:
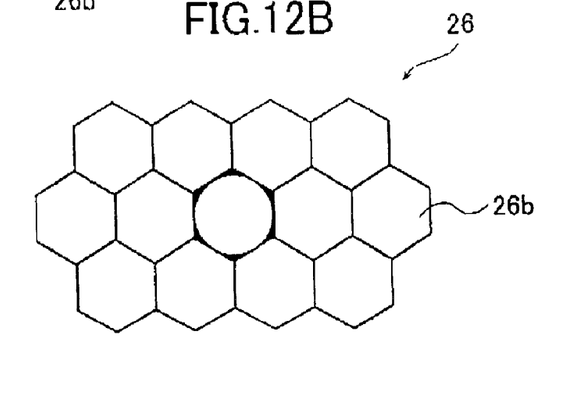
FIG. 12B is a plan view that schematically shows the embodiment shown in FIG. 12A.

Alternatively, it is also preferable that the form of the surface from which the light is issued is set as being hexagonal and the microlenses 26b are arranged in a hexagonal close-packed state (honeycomb state), as schematically shown in FIGS. 12A and 12B.

By taking this form, the area which can not issue the collimated light is only an area outside a circle inscribed in this hexagon as shown by an area filled in black in FIG. 12B and, therefore, the ratio of the area of the surface from which the collimated light is issued and the area of the surface of the lens substrate 24 can be brought to be 90.7% ($=3^{1/2}\pi/6$) to the maximum thereby allowing to obtain a more efficient collimating plate.

The form of the light entrance areas 28 is not limited to a circle the center of which is set on or coincident with the optical axis (z axis) of the microlenses 26b as illustrated, but various forms maybe permissible in accordance with the form of the surface of the microlenses 26b from which the light is issued.

The size of the light entrance areas 28 is not limited in any specific way. The smaller the size becomes, the more advantageous it becomes from the standpoint of the collimating capability, while, the larger size becomes, the more advantageous it becomes from the standpoint of light utilization efficiency. Therefore, the size of the light entrance areas 28 may optionally be determined in accordance with an application or the size of the collimating plate, the size of the microlenses, required collimating capability, luminance of the collimated light and the like.

As already mentioned, in the display apparatus 10, the collimated light issued from the backlight section 14 (the collimated backlight) is launched into the liquid crystal display panel 12 (hereinafter referred to as display panel 12), whereupon the backlight section 14 is related to a lighting apparatus according to the fourth aspect of the present invention that utilizes any of the collimating plates according to the first to the third aspects of the present invention.

In the display apparatus 10 of the present invention, the display panel 12 is a known liquid crystal display panel used in various kinds of LCDs. As an embodiment, illustrated is the display panel 12 in which a liquid crystal layer is sandwiched between two glass substrates, with a polarizer plate provided on each face of both glass substrates away from the liquid crystal layer. Various kinds of optical compensating films such as a phase compensating film and the like may optionally be provided between the glass substrate and the polarizer plate.

The display panel 12 may therefore be of a full-color or monochromatic type and has no limitations on the type of liquid crystal, liquid crystal cell, drive device (switching device) such as a TFT (thin-film transistor), black matrix (BM) and the like.

The display panel 12 may be operated in all known modes including a TN (twisted nematic) mode, an STN (supertwisted nematic) mode, an ECS (electrically controlled birefringence) mode, an IPS (in-plane switching) mode, an MVA (multi-domain vertical alignment) mode and the like.

As the light launched into the display panel 12 passes therethrough, it becomes an image-bearing light and is diffused by the light diffusing plate 16 to produce image display to the viewer. It has already been mentioned that one can increase the range of viewing angles of an LCD by using collimated backlight, namely, the collimated light as the backlight, and diffusing an image-bearing light which has passed through the display panel 12 by means of the light diffusing plate 16.

In the display apparatus 10 of the present invention, the light diffusing plate 16 is not limited in any particular way. Known light diffusing plates (light diffusing sheets) of various type are available, including the light diffusing plate disclosed in Japanese Unexamined Patent Publication No.

5-333202, comprising a transparent electronic conductive layer between a transparent support and a light diffusing layer; the light diffusing plate disclosed in Japanese Unexamined Patent Publication No. 7-5306, comprising between a transparent support and a light diffusing layer a layer of a cross-linked ionic conductive resin containing a cationic radical of quaternary ammonium salt on a side chain, and the like.

Figure 13:
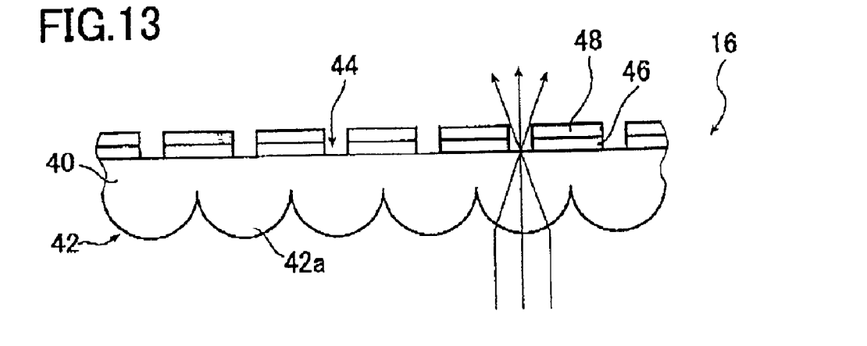
FIG. 13 is a conceptual sectional view of an embodiment of the light diffusing plate incorporated into the liquid crystal display apparatus shown in FIG. 1.

FIG. 13 schematically shows the light diffusing plate 16 as a preferred embodiment which is used in the display apparatus 10 as illustrated.

This light diffusing plate 16 comprises a lens substrate 40 in plate form having a microlens array 42 formed on one side as a two-dimensional arrangement of a multitude of hemispherical microlenses 42a.

The surface of the other side of the lens substrate 40 away from the lens array 42 is entirely covered with a light shield layer 46 except in light exit areas 44 that are set on-axis or in alignment with the optical axes of the microlenses 42a. The surface of the side of the lens substrate 40 which is closer to the viewer's eyes than the light shield layer 46 is entirely covered with an anti-reflective (AR) layer 48 except in the light exit areas 44.

As seen from FIGS. 2A, 2B and 13, this light diffusing plate 16 basically has the same construction as the collimating plate 18 as described before except that the anti-reflective layer 48 is formed instead of the diffuse reflecting layer 32.

The light diffusing plate 16 is fixed with the side of the lens array 42 facing the display panel 12.

The light diffusing plate 16 operates in an inverse manner to the collimating plate 18. The image-bearing light (collimated light) which has passed through the display panel 12 is launched into the microlenses 42a where it is refracted to diffuse and issued from the light exit areas 44 as diffused light.

On the other hand, the light launched into the outside of the light exit areas 44 (a flare) is blocked by the light shield layer 46 so that it does not prevent viewing. Moreover, as a preferred embodiment, the anti-reflective layer 48 is formed on top (viewing side) of the light shield layer 46, enabling to view images in a better state. The anti-reflective layer 48 is not limited in any particular way, hence various known anti-reflective layers may be available.

A preferred example of the light diffusing plate other than the illustrated light diffusing plate 16 is one that replaces the hemispherical microlenses 42a with a multitude of light-transmissive spherical beads which are fixed in one layer on a transparent base sheet in such a way that they partly contact the base sheet.

In the display apparatus 10 of the present invention as shown in FIG. 1, the backlight section 14 related to the lighting apparatus according to the fourth aspect of the present invention that employs the collimating plate 18 or 19 according to any of the first to the third aspects of the present invention can be replaced with a backlight section 15a or 15b related to a lighting apparatus according to the fifth aspect of the present invention.

Figure 14:
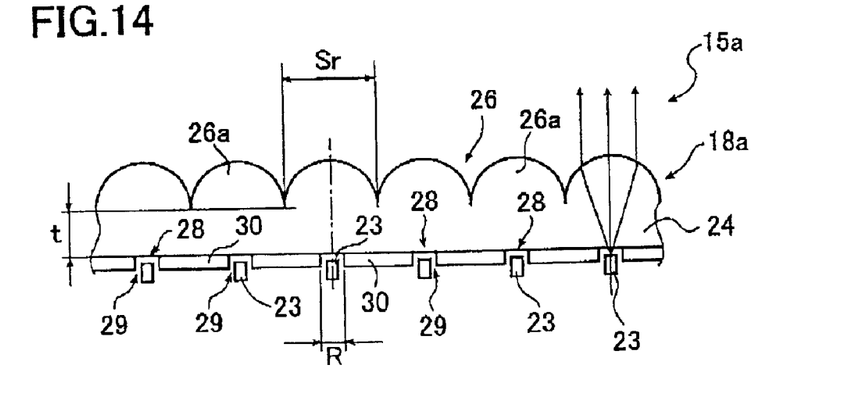
FIG. 14 is a conceptual sectional view of an embodiment of a lighting apparatus according to another aspect of the present invention.
Figure 15:
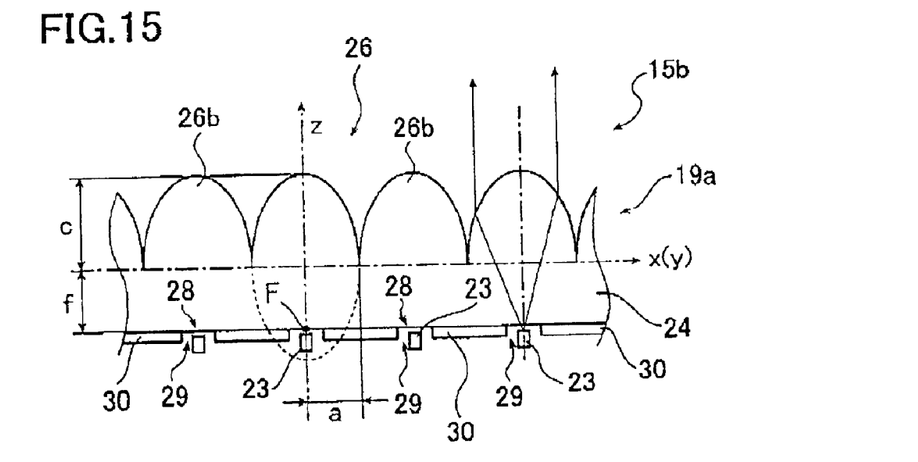
FIG. 15 is a conceptual sectional view of another embodiment of a lighting apparatus according to another aspect of the present invention.

FIGS. 14 and 15 schematically show backlight sections 15a and 15b related to a lighting apparatus according to the fifth aspect of the present invention.

Backlight sections 15a and 15b related to a lighting apparatus according to the fifth aspect of the present invention as shown in FIGS. 14 and 15 are provided with a collimating plate 18a corresponding to the collimating plate 18 according to the first and second aspects of the present invention shown in FIG. 2A with the diffuse reflecting layer 32 omitted therefrom and a collimating plate 19a corresponding to the collimating plate 19 according to the third aspect of the present invention shown in FIG. 10A with the diffuse reflecting layer 32 omitted therefrom, respectively. The collimating plates 18a and 19a have openings 29 providing light entrance areas 28, that are recesses defined in the light shield layer 30. In each of the openings 29 is arranged a light source 23 such as a point source whose size is smaller than that of a recessed opening 29. Consequently, the collimating plates 18a and 19a used in the backlight sections 15a and 15b of these embodiments have the same constitutions as the collimating plate 18 as shown in FIG. 2A and the collimating plate 19 as shown in FIG. 10A respectively except that the diffuse reflecting layer 32 is not provided, so that the same numerals as used in the collimating plates 18 and 19 are used to denote the same components in the collimating plates 18a and 19a and the detailed description thereof is omitted.

Light sources which may be advantageously used as the light sources 23 are those which have a smaller size than that of the recessed openings 29 and can be inserted into the recessed openings 29. The light emission size of the light sources 23 may be smaller than the size of the openings 29 (the light entrance areas 28). Examples of such light sources 23 include LEDs, organic EL devices and the like.

By taking this configuration, the light issued from the light sources 23 (the source light) can be efficiently incident on the light entrance areas 28 alone of the lens substrate 24 of the collimating plate 18a or 19a and a collimated light can be generated and issued with much higher light utilization efficiency.

On this occasion, since only little or a negligible amount of the light issued from the light sources 23 leaks out of the openings 29, it is not necessary to fix a housing on the side of the collimating plate 18a or 19a where the lens substrate 24 exists so as to prevent the leak of the light issued from the light sources 23 and thereby increase the source light utilization efficiency as in the backlight section 14 shown in FIG. 1. Meanwhile, a plate (not shown) for arranging small light sources 23 in accordance with a plurality of recessed openings 29 may be fixed on the side of the collimating plate 18a or 19a where the lens substrate 24 exists. By using such a plate, a collimated light can be generated and issued with much higher light utilization efficiency. On the side of the plate as above (not shown) which is nearer to the light sources 23 may be provided a diffuse reflecting surface.

As described above, in the collimating plates 18a and 19a employed in the backlight sections 15a and 15b of the present embodiments, it is for the increase of efficiency to arrange the light sources 23 in accordance with the respective openings 29 and it is more efficient if the light emission size of such light sources 23 is smaller than the aperture size of the openings 29. It is because almost all of the light emitted from the light sources 23 is then incident on the lens array 26. Consequently, when the light emission size of the light sources 23 is smaller than the aperture size of the openings 29 and the light sources 23 are arranged inside the openings 29 as in the collimating plates 18a and 19a illustrated, it is not necessary to provide a diffuse reflecting layer. The diffuse reflecting layer of a collimating plate has not so much relation to the collimating capability so that the collimating capability is not reduced by omitting the diffuse reflecting layer.

If light sources whose light emission size is larger than the aperture size of the openings 29 of the collimating plate are employed as small light sources 23 in the backlight sections 15a and 15b of the present embodiments, effects of a diffuse reflecting layer are appreciated. Accordingly in such a case, it is advantageous to replace the collimating plates 18a and 19a neither of which has a diffuse reflecting layer with the collimating plate 18 shown in FIG. 2A and the collimating plate 19 shown in FIG. 10A each of which has the diffuse reflecting layer 32. The collimating plates 18 and 19 each having the diffuse reflecting layer are of preferred configuration for the increase of light utility efficiency, that is, for the increase of the luminance of light, especially when combined with a lamp housing as shown in FIG. 1.

Also in the collimating plate 18 according to the first and second aspects of she present invention shown in FIG. 4 and the collimating plate 19 according to the third aspect of the present invention shown in FIG. 11 as well as in the collimating plates (not shown) obtained by omitting the diffuse reflecting layer 32 from the collimating plates 18 and 19 as above, a collimated light can be generated and issued with much higher light utilization efficiency as in the backlight sections 15a and 15b shown in FIGS. 14 and 15 by arranging the light sources 23, preferably the light sources 23 whose size is equal to or smaller than the size of the light entrance areas 28 in the vicinity of the light entrance areas 28 produced in the protrusions 24a of the lens substrate 24 which are surrounded with the light shield layer 30 and the diffuse reflecting layer 32 or with the light shield layer 30 alone. In the present embodiments, it is particularly preferred to use light sources which issue the light of good directivity as light sources 23 and a plate or housing (not shown) for arranging a plurality of small light sources 23 may be advantageously fixed on the side of the collimating plate 18 or 19 where the lens substrate 24 exists. In these cases also, the collimating plate without the diffuse reflecting layer may be employed when the light emission size of the light sources 23 is smaller than the size of the light entrance areas 28 of the collimating plate and the collimating plate with the diffuse reflecting layer (the collimating plate 18 or 19) may be employed when the light emission size of the light sources 23 is larger than the size of the light entrance areas 28 or when a plate or housing is fixed.

While the collimating plate, the lighting apparatus and the liquid crystal display apparatus of the present invention has been described above in detail with reference to various embodiments, it should be understood that the present invention is by no means limited to the foregoing embodiments alone and various improvements and design modifications may of course be made without departing from the scope and spirit of the present invention.

As described in detail hereinbefore, the collimating plate according to the first and second aspects of the present invention is the collimating plate possessing an excellent collimating capability that seldom generates a flare and can issue a collimated light which has a high luminance and is of good directivity.

Further, the lighting apparatus of the present invention provided with the collimating plate as above utilizes light with high efficiency and can issue a collimated light which has a high luminance and is of good directivity.

Moreover, the liquid crystal display apparatus of the present invention comprising the lighting apparatus as above can display without display unevenness or image blur and display an image of high contrast over a wide range of viewing angles.

As described in detail hereinbefore, the collimating plate according to the third aspect of the present invention is the collimating plate possessing an excellent collimating capability that can issue a collimated light which has a high luminance and is of good directivity.

Further, the lighting apparatus of the present invention provided with the collimating plate as above utilizes light with high efficiency and can issue a collimated light which has a high luminance and is of good directivity.

Moreover, the liquid crystal display apparatus of the present invention comprising the lighting apparatus as above can display without display unevenness or image blur and display an image of high contrast over a wide range of viewing angles.

What is claimed is:

1. A collimating plate comprising:

a lens substrate;

a plurality of microlenses disposed on a surface of said lens substrate, from which collimated light issued;

a plurality of light entrance areas disposed on another surface of said lens substrate, into which light is launched, each having a circular form, a center of which is on an optical axis of each of said plurality of microlenses and set on another surface of the lens substrate reverse to said plurality of microlenses;

a light shield layer formed on said another surface of said lens substrate reverse to said plurality of microlenses so as to cover an area other than said plurality of light entrance areas; and a diffuse reflecting layer formed on a surface of said light shield layer at a light entrance side of said light shield layer so as to cover the area other than said plurality of light entrance areas, wherein when a refractive index of said lens substrate is represented by n;

a thickness of said lens substrate by t;

a diameter of each of said plurality of light entrance areas by R; and a size of each of said plurality of microlenses by Sr, the following formula (1):

$$Sr \geq 2t \times \tan \theta + R \qquad (1)$$

(with the proviso that $\theta = \sin^{-1}(1/n)$)

is satisfied.

2. The collimating plate according to claim 1, wherein said plurality of microlenses are either in circular form when viewed from a direction of the optical axis and are arranged in a closest packing state or in hexagonal form when viewed from the direction of the optical axis and are arranged in a hexagonal close-packed state.

3. The collimating plate according to claim 1, wherein said refractive index of said lens substrate is between 1.4 and 2.

4. A lighting apparatus comprising:

at least one light source;

a lamp housing for containing said at least one light source, whose inner surfaces are covered with a diffuse reflecting layer; and a collimating plate for condensing light issued from said at least one light source and reflected by said inner surfaces of said lamp housing to produce collimated light and then issuing said collimated light, wherein said collimating plate comprises:

a lens substrate;

a plurality of microlenses disposed on a surface of said lens substrate, from which said collimated light is issued;

a plurality of light entrance areas disposed on another surface of said lens substrate, into which said light from said lamp housing is launched, each having a circular form a center of which is on an optical axis of each of said plurality of microlenses and set on another surface of the lens substrate reverse to said plurality of microlenses:

a light shield layer formed on said another surface of said lens substrate reverse to said plurality of microlenses so as to cover an area other than said plurality of light entrance areas; and a diffuse reflecting layer formed on a surface of said light shield layer at a light entrance side of said light shield layer so as to cover the area other than said plurality of light entrance areas, wherein when a refractive index of said lens substrate is represented by n;

a thickness of said lens substrate by t;

a diameter of each of said plurality of light entrance areas by R; and a size of each of said plurality of microlenses by Sr, the following formula (1):

$$Sr \geq 2t \times \tan \theta + R \qquad (1)$$

(with the proviso that $\theta = \sin^{-1}(1/n)$) is satisfied.

5. A liquid crystal display apparatus comprising:

a liquid crystal display panel; and a lighting apparatus for launching collimated light into said liquid crystal display panel, wherein said lighting apparatus comprises:

at least one light source;

a lamp housing for containing said at least one light source, whose inner surfaces are covered with a diffuse reflecting layer; and a collimating plate for condensing light issued from said at least one light source and reflected by said inner surfaces of said lamp housing to produce said collimated light and then issuing said collimated light, wherein said collimating plate comprises:

a lens substrate;

a plurality of microlenses disposed on a surface of said lens substrate, from which said collimated light is issued;

a plurality of light entrance areas disposed on another surface of said lens substrate, into which said light from said lamp housing is launched, each having a circular form a center of which is on an optical axis of each of said plurality of microlenses and set on another surface of the lens substrate reverse to said plurality of microlenses;

a light shield layer formed on said another surface of said lens substrate reverse to said plurality of microlenses so as to cover an area other than said plurality of light entrance area; and a diffuse reflecting layer formed on a surface of said light shield layer at a light entrance said of said light shield layer so as to cover the area other than said plurality of light entrance areas, wherein when a refractive index of said lens substrate is represented by n;

a thickness of said lens substrate by t;

a diameter of each of said plurality of light entrance areas by R; and a size of each of said plurality of microlenses by Sr, the following formula (1):

$$Sr \geq 2t \times \tan \theta + R \qquad (1)$$

(with the proviso that $\theta = \sin^{-1}(1/n)$) is satisfied.

6. The liquid crystal display apparatus according to claim 5, further comprising a light diffusing plate for diffusing an image-bearing collimated light which has passed through said liquid crystal display panel.

7. The liquid crystal display apparatus according to claim 5, wherein said light diffusing plate comprises:

a lens substrate;

a plurality of microlenses disposed on a surface of said lens substrate, into which said image-bearing collimated light is launched;

a plurality of light exit areas disposed on another surface of said lens substrate, from which diffused light to display an image is issued, each having a circular form a center of which is concident with an optical axis of each of said plurality of microlenses;

a light shield layer formed on said another surface of the lens substrate reverse to said plurality of microlenses, and covering the area other than said plurality of light exit areas; and an anti-reflective layer formed on a surface of said light shield layer at a light exit side than said light shield layer, and covering area other than said plurality of light exit areas.

8. A collimating plate comprising:

a lens substrate;

a plurality of microlenses disposed on a surface of said lens substrate, from which collimated light is issued;

a plurality of light entrance areas disposed on another surface of said lens substrate, into which light is launched, each having a circular form a center of which is on an optical axis of each of said plurality of microlenses and set on another surface of the lens substrate reverse to said plurality of microlenses;

a light shield layer formed on said another surface of said lens substrate reverse to said plurality of microlenses so as to cover an area other than said plurality of light entrance areas; and a diffuse reflecting layer formed on a surface of said light shield layer at a light entrance side of said light shield layer so as to cover the area other than said plurality of light entrance areas.

9. The collimating plate according to claim 8, further comprising a plurality of protrusions provided on a side of said another surface of said lens substrate, wherein a and surface of each of said plurality of protrusions becomes each of said plurality of light entrance areas.

* * * * *